United States Patent [19]

Shah et al.

[11] Patent Number: 4,794,016

[45] Date of Patent: Dec. 27, 1988

[54] REDUCTION OF INSTANT RICE POUR-OFF

[75] Inventors: Manoj K. O. Shah, Dover, Del.; Arthur H. Cohee, Jr., Ridgely, Md.; Joseph D. Burke, Philipsburg; Gary F. Greenwald, Hamilton Square, both of N.J.

[73] Assignee: General Foods Corporation, White Plains, N.Y.

[21] Appl. No.: 48,707

[22] Filed: May 12, 1987

[51] Int. Cl.$^4$ .................................. A23L 1/182
[52] U.S. Cl. .................................. 426/618; 426/388; 426/453; 426/459; 426/460; 426/463
[58] Field of Search .............. 426/618, 459, 460, 463, 426/453, 388

[56] References Cited

U.S. PATENT DOCUMENTS 2,438,939  4/1948  Ozai-Durrani .................... 426/450

Primary Examiner—Donald E. Czaja
Assistant Examiner—Mary S. Mims
Attorney, Agent, or Firm—Sam D. Walker; Thomas R. Savoie; Daniel J. Donovan

[57] ABSTRACT

The present invention teaches a method for reducing pour-off in instant rice product by coating cooked rice prior to drying with instant rice fines, said instant rice fines having a granulation of $-20$ m$+80$ m and is applied in amounts up to 2% by weight of the instant rice.

4 Claims, 2 Drawing Sheets

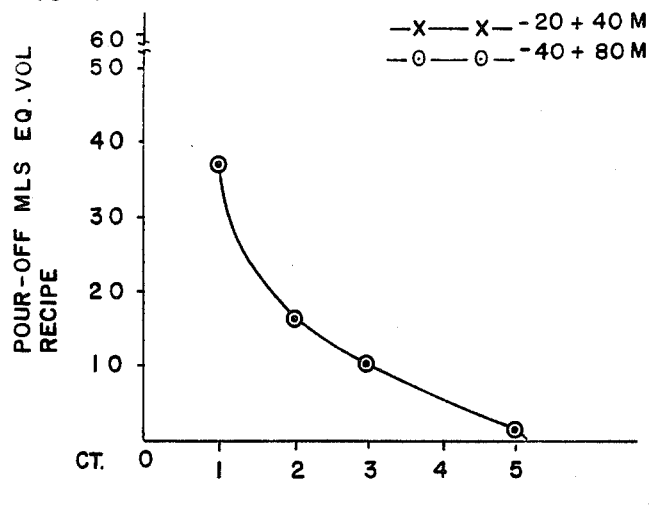
FIG.1 POUR-OFF VS CODE 42 FINES LEVELS & GRANULATIONS
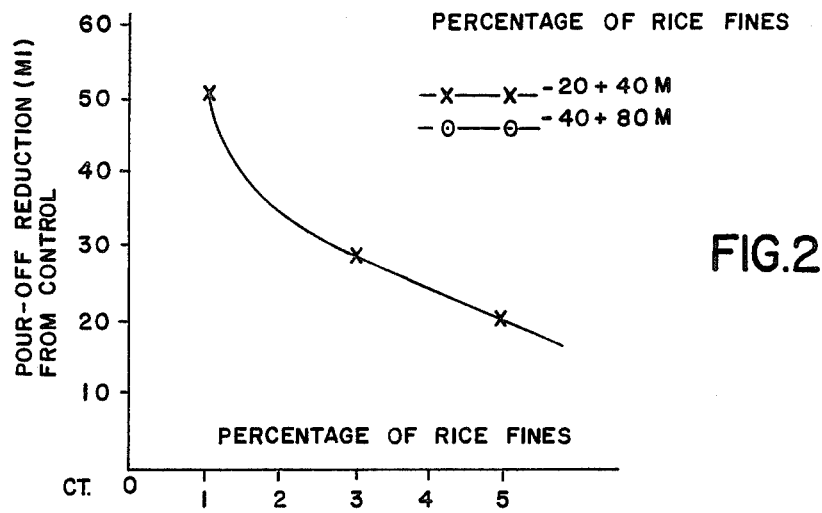
FIG.2
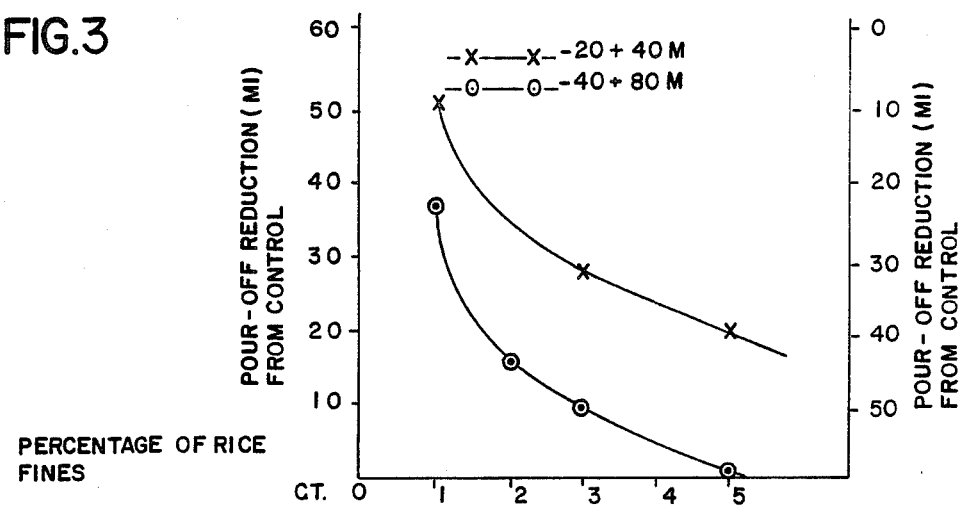
FIG.3

REDUCTION OF INSTANT RICE POUR-OFF

FIELD OF THE INVENTION

The present invention is concerned with reducing excessive pour-off in instant rice products. More particularly, the present invention is concerned with the addition of instant rice fines to reduce pour-off in instant rice products.

BACKGROUND OF THE INVENTION

Precooked rice in the form of dehydrated, gelatinized rice grains, which reconstitute to form products similar to those obtained by boiling commodity rice in water is well known in the prior art. An exemplary method for producing dehydrated precooked rice grains of the quick cooking or "instant" type which has enjoyed wide commercial success is disclosed in U.S. Pat. No. 2,438,939 by Ozai-Durrani.

The preparation of an "instant" rice product in a recipe form generally requires the addition of a fixed amount of water to a fixed volume of use. The suggested amount of water should generally be sufficient to dehydrate the rice, producing a finished product having the desired texture and mouthfeel. As a result of the production variation from batch to batch, the amount of water required to prepare a finished product would vary depending on the level of gelatinization per batch. To compensate for the batch-to-batch variation, an amount of water is selected to compensate for any and all variations which often times result in an excess requiring pouring off of the excess water.

An object of the present invention is, therefore, to reduce the pour-off in instant rice products.

Another object of the present invention is to improve the uniformity of instant rice products.

A further object of the present invention is to provide an efficient use of waste by-product from the manufacture of instant rice.

SUMMARY OF THE INVENTION

The present invention is concerned with a method for reducing pour-off in instant rice products comprising contacting instant rice fines having an effective granulation and being present in amounts sufficient to lower the pour-off of the finished instant product by up to 100% with instant rice prior to drying and drying same to a moisture ranging from 5.0 to 15.0%.

The present invention is also concerned with an instant rice product comprising an instant rice contacted with instant rice fines, said fine having an effective granulation and being present in amounts sufficient to lower the pour-off of the finished instant product by up to 100%.

DETAILED DESCRIPTION

Figure 4:
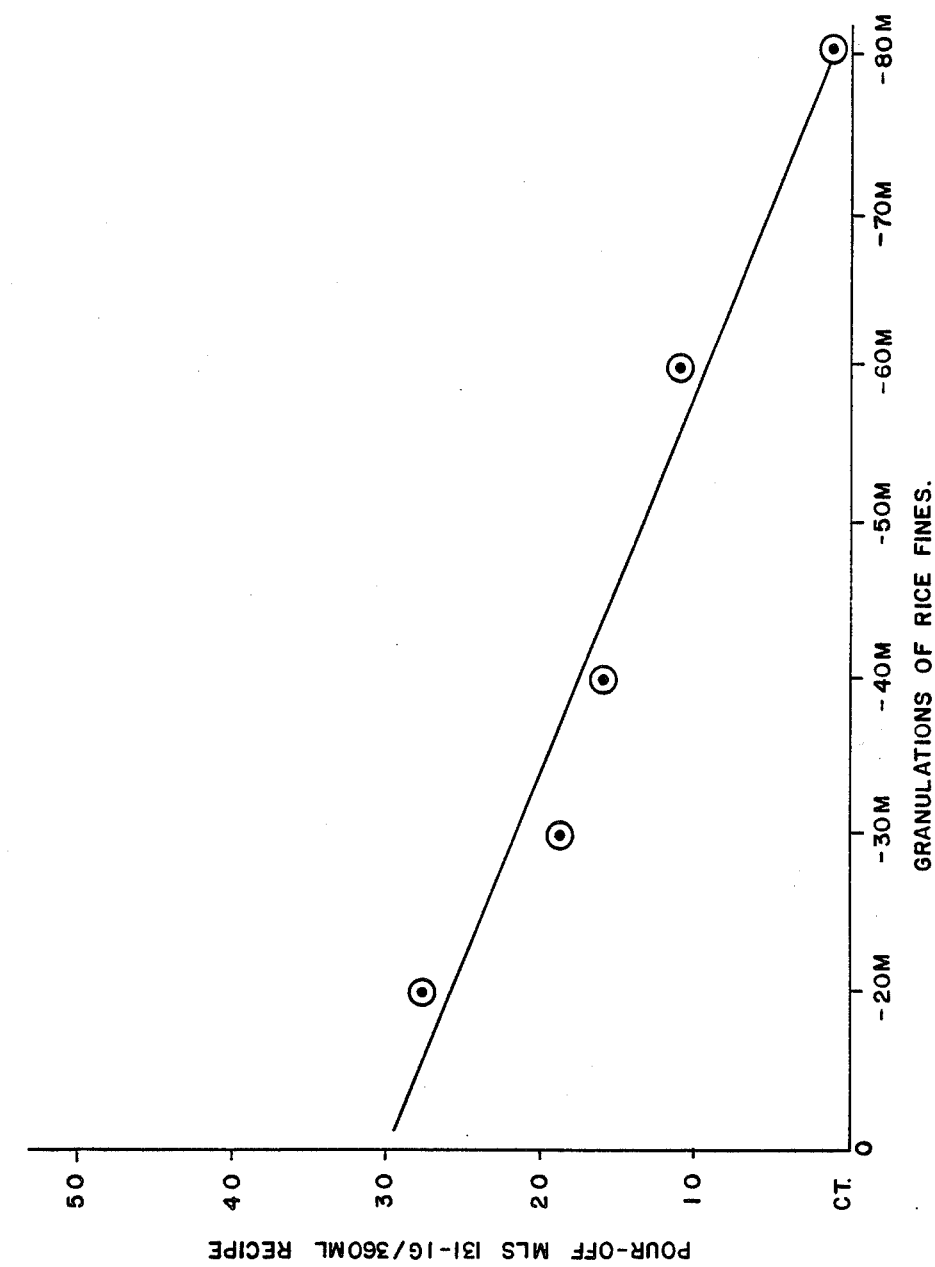

The present invention is concerned with a method for reducing the pour-off associated with the preparation of instant rice product and the finished product resulting therefrom.

In the present invention instant rice is contacted i.e. coated with instant rice fines having an effective granulation and being present in amounts sufficient to lower the pour-off of the finished instant rice product by up to 100% with instant rice prior to drying and drying same to a moisture ranging from 5.0% to 15.0% by weight. Typically, the pour-off is generally reduced by from 50% to 100%.

The term "instant rice fines" is defined as precooked rice fines particulate smaller than rice.

The term "pour-off" is defined as excess water remaining after completion of defined recipe time due to lack of absorption.

To instantize the rice of the present invention, the raw rice is cooked by any of the well-known methods, such as immersion cooking in boiling water, steam cooking or combination of both methods and the like. Although the method of cooking the rice is not particularly critical, the degree to which the rice is gelatinized by any of the above methods is important for the attainment of a product having the desirable textural characteristic of freshly cooked rice. The rice should be cooked to the point of being geletinized and over cooking should be avoided. The preferred degree of cook is determined by a moisture analysis and a rice texture measurement which is accomplished by the use of a texture measurement device such as a FTC texture press. Rice at the desired degree of gelatinization will have a moisture content ranging from about 55% to about 75%. Typically, heating the rice to temperatures ranging from 190° to 210° F. and for about 30 to about 40 minutes will accomplish the desired level of gelatinization.

The cooked rice is then drained to remove the excess moisture therefrom. The cooked rice is typically dried to a desired moisture level by known conventional means. After draining, according to the present invention, the cooked rice is contacted with instant rice fines prior to drying. This is accomplished by dusting or spraying the instant rice fines onto the surface of the gelatinized or cooked rice. For best results, however, care should be taken to insure uniform distribution of the instant rice fines onto the surface of the gelatinized rice, some agitation being preferred.

The instant rice fines are prepared by shifting the dried precooked rice through desired screens and recovering the by-products.

The instant rice fines serve the purpose of reducing the pour-off encountered when preparing an instant rice product. For instance, in the present invention the amounts of pour-off is reduced to close to zero. The factors which affect the degree of pour-off are the amount of instant rice fines contacted with the gelatinized rice and the granulation of the fines. In the present invention levels of rice fines up to 5% have proven suitable without adverse effect on the quality of the final product. However, as the levels increase beyond 5%, the effect on pour-off becomes negligible (FIGS. 1, 2 and 3). Reduction in pour-off is increased as the level of instant rice fines approach 5%, and is at its highest level at about 5%. However, good results are obtained when the level of rice fines range from 2.0% to 3.5% by weight.

Another factor affecting pour-off is the granulation of the instant rice fines. As the granulation increases the level of pour-off decreases (FIG. 4). Generally, granulation ranging from about −20 m to about +80 m is suitable. However, the preferred granulation ranges from about −40 m to about +80 m.

The coated rice is then dried to a moisture content of about 5.0 to about 15.0% by any convenient method. Drying, however, is preferably accomplished by subjecting the gelatinized, cooked rice to a heated air stream under operating conditions so that the dried rice will not toast or otherwise burn.

It is believed that the addition of instant rice fines increases the surface area in the finished product without changing its volume. Since the instant rice fine has similar water absorption properties to instant rice, the resulting product has lower pour-off.

A finished product is prepared by reconstituting the drying rice with an equal volume of water. The finished product had a significant reduction in pour-off with texture and appearance similar to freshly cooked rice.

The salient features of the present invention is further illustrated by the following tables and graphs.

MINUTE RICE POUR-OFF REDUCTION
II Addition of Minute Rice Fines
−20 + 40 M granulation
−40 + 80 M granulation
At 1%
At 3% & 5% levels

| Granulation | Level % | Eq. Vol. 1½ C. Recipe Wt. Gm. | Pour-Off ML | Significant Pour-off Reduction |
|---|---|---|---|---|
| −20 + 40 M | 1 | 131.8 | 51 | No |
|  | 3* | 134.4 | 28 | Yes |
|  | 5 | 137.0 | 20 | Yes |
| −40 + 80 M | 1* | 131.8 | 37 | Yes |
|  | 2* | 133.1 | 16 | Yes |
|  | 3 | 134.4 | 10 | Yes |
|  | 5 | 137.0 | 0 | Yes |
| CT* | 100 | 130.5 | 59 | — |

*Selected for taste test

MINUTE RICE POUR-OFF REDUCTION

| Yes Addition of | Addition of (To Minute Rice) Minute Rice Fines | | | Significant Pour-off Reduction | |
|---|---|---|---|---|---|
|  | Granulation | Level | Recipe 1½ cup | Pour-Off | |
| Minute Rice Fines | −20 M | 5% | Q.C. (131.1 gm.) | 28 | |
|  | −20 M | 5% | Eq. Vol. (140.0 gm.) | 8 | |
|  | −30 M | 5% | Q.C. | 19 | |
|  |  | 10% | Q.C. | 0 | |
|  | −40 M | 5% | Q.C. | 16 | |
|  | −60 M | 5% | Q.C. | 11 | |
|  | −80 M | 5% | Q.C. | Trace | |
|  | Control | Q.C. | Q.C. | 59 | |

What is claimed is:

1. a method for reducing pour-off in instant rice products comprising: coating instant rice prior to drying with instant rice fines, said rice fines having granulation ranging from −20 m to +80 m and in amounts up to 5% by weight, said amounts being sufficient to lower the pour-off of the finished instant rice product by up to 100%, subsequently drying the coated instant rice to a moisture content ranging from 5.0% to 15%.

2. A method according to claim 1 wherein the amount of instant rice fines ranges from 2% to 3.5% by weight.

3. An instant rice product comprising an instant rice coated with instant rice fines, said fines having granulation ranging from −20 m to +80 m and being present in amounts up to 5% by weight, said amounts being sufficient to lower the pour-off of the finished instant product by up to 100%.

4. An instant rice product according to claim 3 wherein the amount of instant rice fines range from 2% to 3.5% by weight.

* * * * *